US008412857B2

(12) United States Patent
Ady et al.

(10) Patent No.: US 8,412,857 B2
(45) Date of Patent: Apr. 2, 2013

(54) AUTHENTICATING, TRACKING, AND USING A PERIPHERAL

(75) Inventors: Roger W. Ady, Chicago, IL (US); Sanjay Gupta, Lakewood, IL (US); Jiri Slaby, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 70 days.

(21) Appl. No.: 12/982,981

(22) Filed: Dec. 31, 2010

(65) Prior Publication Data
US 2012/0131230 A1 May 24, 2012

Related U.S. Application Data

(63) Continuation-in-part of application No. 12/951,467, filed on Nov. 22, 2010.

(51) Int. Cl.
*G06F 3/00* (2006.01)
(52) U.S. Cl. ............ 710/8; 710/3; 710/11; 710/15; 710/36; 710/37; 710/39; 710/62; 710/303; 710/107; 710/200; 710/220; 710/240
(58) Field of Classification Search .............. 710/3, 8, 710/11, 15, 36, 37, 39, 62, 303, 107, 200, 710/220, 240
See application file for complete search history.

(56) References Cited

U.S. PATENT DOCUMENTS

| 5,028,859 A | 7/1991 | Johnson et al. |
| 6,381,477 B1 | 4/2002 | Johnson, Jr. et al. |
| 7,028,105 B2 | 4/2006 | Dute et al. |
| 7,242,923 B2 * | 7/2007 | Perera et al. ............ 455/411 |
| 7,451,064 B2 | 11/2008 | Hodge et al. |
| 7,498,766 B2 | 3/2009 | Paul et al. |
| 7,571,263 B2 | 8/2009 | Campello et al. |
| 7,598,700 B2 | 10/2009 | Elder et al. |
| 7,656,867 B2 | 2/2010 | Herbert |
| 7,734,933 B1 | 6/2010 | Marek et al. |
| 8,225,385 B2 * | 7/2012 | Chow et al. ............ 726/8 |

(Continued)

FOREIGN PATENT DOCUMENTS

| CN | 201438370 U | 4/2010 |
| JP | 2010092202 A | 4/2010 |
| WO | 9737305 A1 | 10/1997 |

OTHER PUBLICATIONS

Patent Cooperation Treaty, "PCT Search Report and Written Opinion of the International Searching Authority" for International Application No. PCT/US2011/058510, May 11, 2012, 18 pages.

(Continued)

*Primary Examiner* — Idriss N Alrobaye
*Assistant Examiner* — Jasjit Vidwan
(74) *Attorney, Agent, or Firm* — Wolfe-SBMC; Sylvia Chen

(57) ABSTRACT

This document describes techniques (300, 600) and apparatuses (102, 106, 700, 800, 900) for peripheral authentication. These techniques (300, 600) and apparatuses (102, 106, 700, 800, 900) may configure data lines for authentication between host device (102) and peripheral (106), use these configured data lines to authenticate the peripheral (106), and then reconfigure the data lines for use. These techniques (300, 600) may also or instead transmit time stamps to a remote entity (402) for tracking peripheral use and/or present home screens (122) responsive to connection to a peripheral (106).

20 Claims, 9 Drawing Sheets

U.S. PATENT DOCUMENTS

| | | | |
|---|---|---|---|
| 2003/0197512 A1* | 10/2003 | Miller et al. | 324/426 |
| 2005/0182860 A1* | 8/2005 | Schneckenburger | 710/8 |
| 2005/0251589 A1 | 11/2005 | Wang | |
| 2006/0190653 A1 | 8/2006 | Wahler et al. | |
| 2006/0277339 A1 | 12/2006 | Sakaki et al. | |
| 2007/0081506 A1 | 4/2007 | Yamada | |
| 2007/0214296 A1 | 9/2007 | Takamatsu et al. | |
| 2008/0091762 A1* | 4/2008 | Neuhauser et al. | 709/201 |
| 2009/0049307 A1* | 2/2009 | Lin | 713/185 |
| 2009/0061678 A1 | 3/2009 | Minoo et al. | |
| 2009/0083834 A1 | 3/2009 | Rubinstein et al. | |
| 2010/0022277 A1 | 1/2010 | An et al. | |
| 2010/0075604 A1* | 3/2010 | Lydon et al. | 455/41.3 |
| 2010/0146134 A1 | 6/2010 | Kobayashi et al. | |
| 2010/0161860 A1 | 6/2010 | Chien et al. | |
| 2010/0295384 A1* | 11/2010 | Kobayashi | 307/154 |
| 2010/0325298 A1* | 12/2010 | Nelson | 709/229 |
| 2012/0021808 A1* | 1/2012 | Tseng | 455/575.1 |
| 2012/0030393 A1* | 2/2012 | Ganesh et al. | 710/303 |
| 2012/0071134 A1* | 3/2012 | Jensen | 455/411 |

OTHER PUBLICATIONS

Hewlett-Packard Company et al., "Universal Serial Bus 3.0 Specification" Revision 1.0, USB Implementers Forum, Nov. 12, 2008, pp. 5-33 and 5-34.

Irfan Nasir et al., "Peripheral Authentication", U.S. Appl. No. 12/951,467, filed Nov. 22, 2010, 33 pages.

Jinrong Qian, "Battery Authentication Improves Battery Security", EE Times-India/eetindia.com, Sep. 10, 2008, 4 pages.

* cited by examiner

AUTHENTICATING, TRACKING, AND USING A PERIPHERAL

BACKGROUND

Users usually accessorize their computing devices. A desktop computer can be accessorized with various peripherals, such as an external hard drive or speakers. A tablet computer can be accessorized with a mouse or external battery. A smartphone can be accessorized with a docking station, an external keyboard, or a charger. These are just a few of many ways in which users accessorize computing devices with peripherals.

These peripherals, however, are difficult to track. Often, users use accessories from different manufacturers (including manufacturers different from the host computing device's manufacturer), and some peripherals may damage or fail to make full use of the host computing device. Some peripherals are not properly designed, such as batteries that overheat or chargers that overload their host computing device. Still other peripherals fail to properly interact with the host computing device, such as its user interface or services. If there is an issue with the host computing device, many users are unable to determine if the issue is caused by the peripheral or by the host computing device.

BRIEF DESCRIPTION OF THE DRAWINGS

Techniques and apparatuses for authenticating, tracking, and using a peripheral are described with reference to the following drawings. The same numbers are used throughout the drawings to reference like features and components.

DETAILED DESCRIPTION

Host computing devices often do not authenticate a peripheral before use of that peripheral. Using a non-authentic peripheral may result in damage to, or less than full use of, the host computing device or peripheral. This disclosure describes techniques and apparatuses for peripheral authentication that can protect host computing devices from potentially damaging peripherals or permit them to be more-fully used. This disclosure also describes techniques and apparatuses for tracking and using a peripheral, including tracking a peripheral in order to address damage to or incompatibilities with a host computing device or to present a home screen on the host computing device responsive to connection to a peripheral.

The following discussion first describes an operating environment, followed by techniques that may be employed in this environment, and ending with example apparatuses.

Operating Environment

Figure 1:
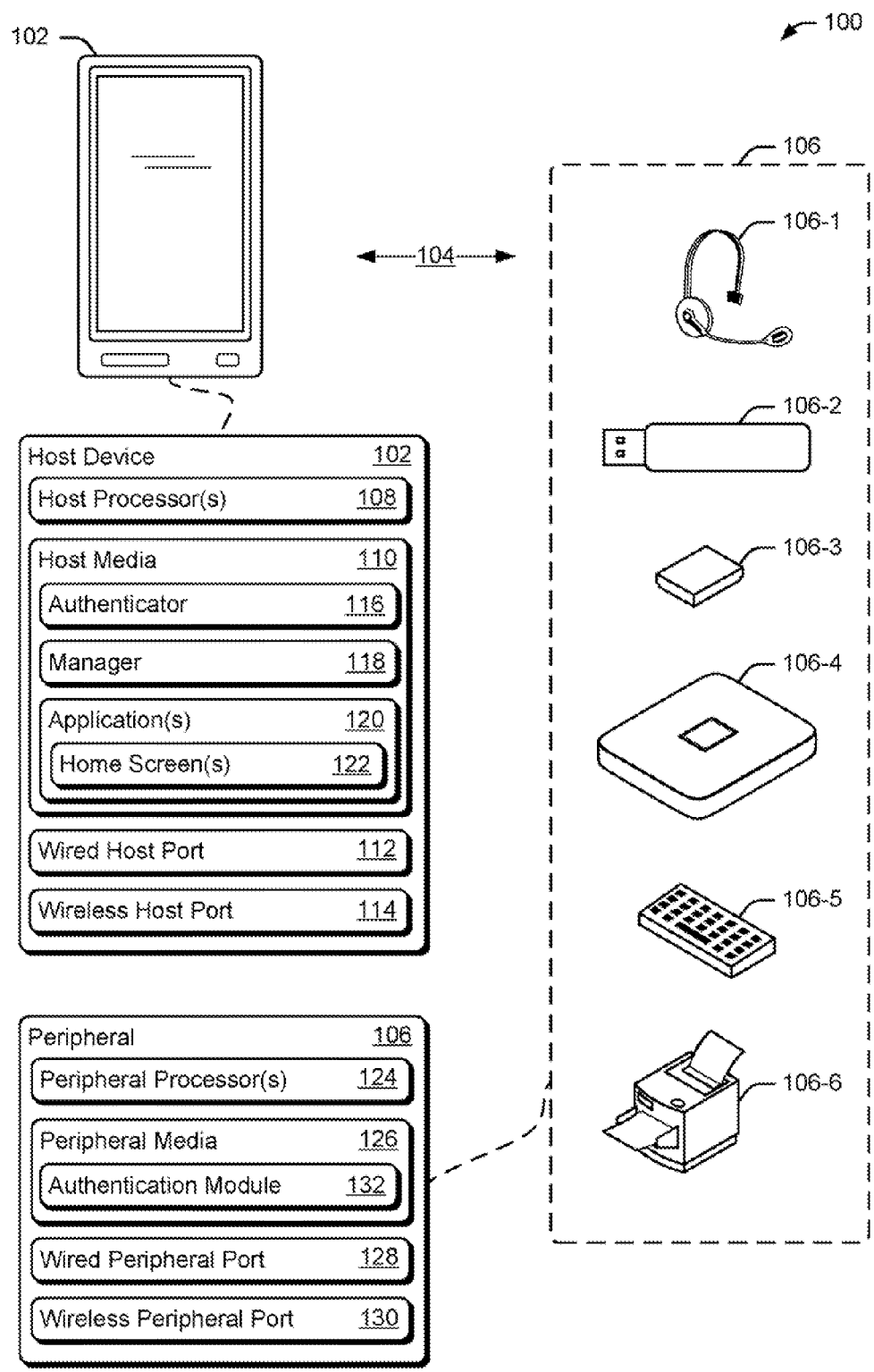
FIG. 1 illustrates an example environment in which techniques for authenticating, tracking, and using a peripheral can be implemented.

FIG. 1 illustrates an example environment 100 in which techniques for peripheral authentication can be implemented. The example environment 100 includes a host device 102, a communication medium 104, and a peripheral 106. The host device 102 can be, or include, many different types of computing devices, such as a smartphone, a cellular phone having limited computational abilities, a laptop, a tablet computer, or a desktop computer, or cordless phone.

Host device 102 includes host processor(s) 108, host computer-readable media 110 (host media 110), a wired host port 112, and/or a wireless host port 114. Host media 110 includes authenticator 116, manager 118, and one or more applications 120. Authenticator 116 authenticates peripheral 106, alone or in conjunction with other elements of host device 102 or peripheral 106. Manager 118 manages services, interfaces, and/or applications of host device 102. Applications 120 provide services and/or user interfaces associated with services, including interfaces associated with services provided by peripheral 106. Each application 120 has one or more home screens 122, each of which is an example of a user interface.

Peripheral 106 can be one of many different types of devices capable of communication with, and providing a service to, host device 102. Six example peripherals are shown, though others are contemplated. These example peripherals include a wireless headset 106-1, a smart flash drive 106-2 having a five-pin universal serial bus (USB) connector, a battery charger 106-3, a docking station 106-4, a keyboard 106-5, and a multi-function printer 106-6.

Peripheral 106 includes peripheral processor(s) 124, peripheral computer-readable media 126 (peripheral media 126), wired peripheral port 128, and/or wireless peripheral port 130. Peripheral media 126 includes an authentication module 132. Authentication module 132 is configured to determine a cryptographic response to a challenge received from host device 102, the cryptographic response indicating that the peripheral device is authentic.

Communication medium 104 provides a wired or wireless medium by which host device 102 and peripheral 106 may communicate. Examples include a wired medium from wired peripheral port 128 to wired host port 112 or a wireless medium of a wireless connection communicating via wireless peripheral port 130 and wireless host port 114. Example wireless networks include personal-area networks (PAN), local-area networks (LAN), and wide-area networks (WAN).

Figure 2:
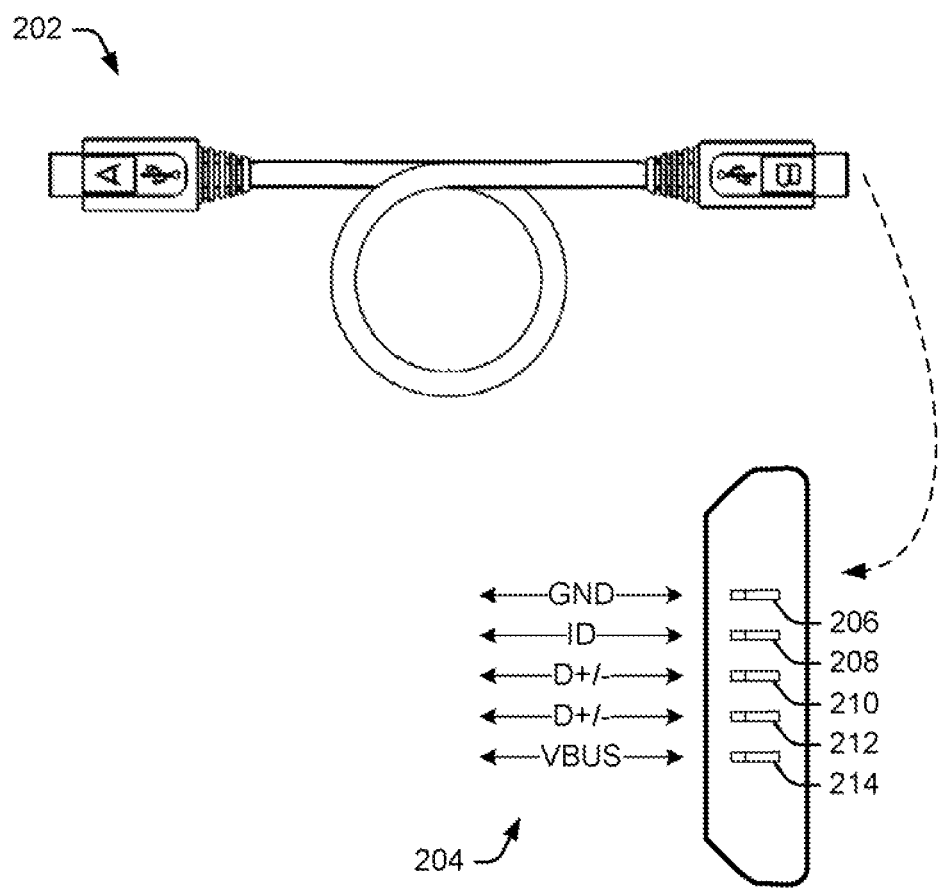
FIG. 2 illustrates an example of a communication medium illustrated in FIG. 1, the example being a micro universal serial bus (USB) cord.

FIG. 2 illustrates an example of communication medium 104, the example being a micro universal serial bus (USB) cord 202. The example micro USB cord 202 has a USB connector that includes five lines 204: a ground line (GND) 206; an identification line (ID) 208; a first data line (D+/−) 210; a second data line (D+/−) 212; and a power line (VBUS) 214. Ways in which micro USB cord 202 can be used are set forth below.

Example Techniques

The following discussion describes techniques for authenticating, tracking, and using a peripheral, which in many cases enable greater safety or better use of host devices or peripherals. These techniques can be implemented utilizing the previously described environment, such as authenticator 116, manager 118, and authentication module 132 of FIG. 1. These techniques include example methods illustrated in FIGS. 3 and 6, which are shown as operations performed by one or more entities. The orders in which these method blocks are described are not intended to be construed as a limitation, and any number or combination of the described method blocks can be combined in any order to implement a method, or an alternate method, including those drawing from both FIGS. 3 and 6.

Figure 3:
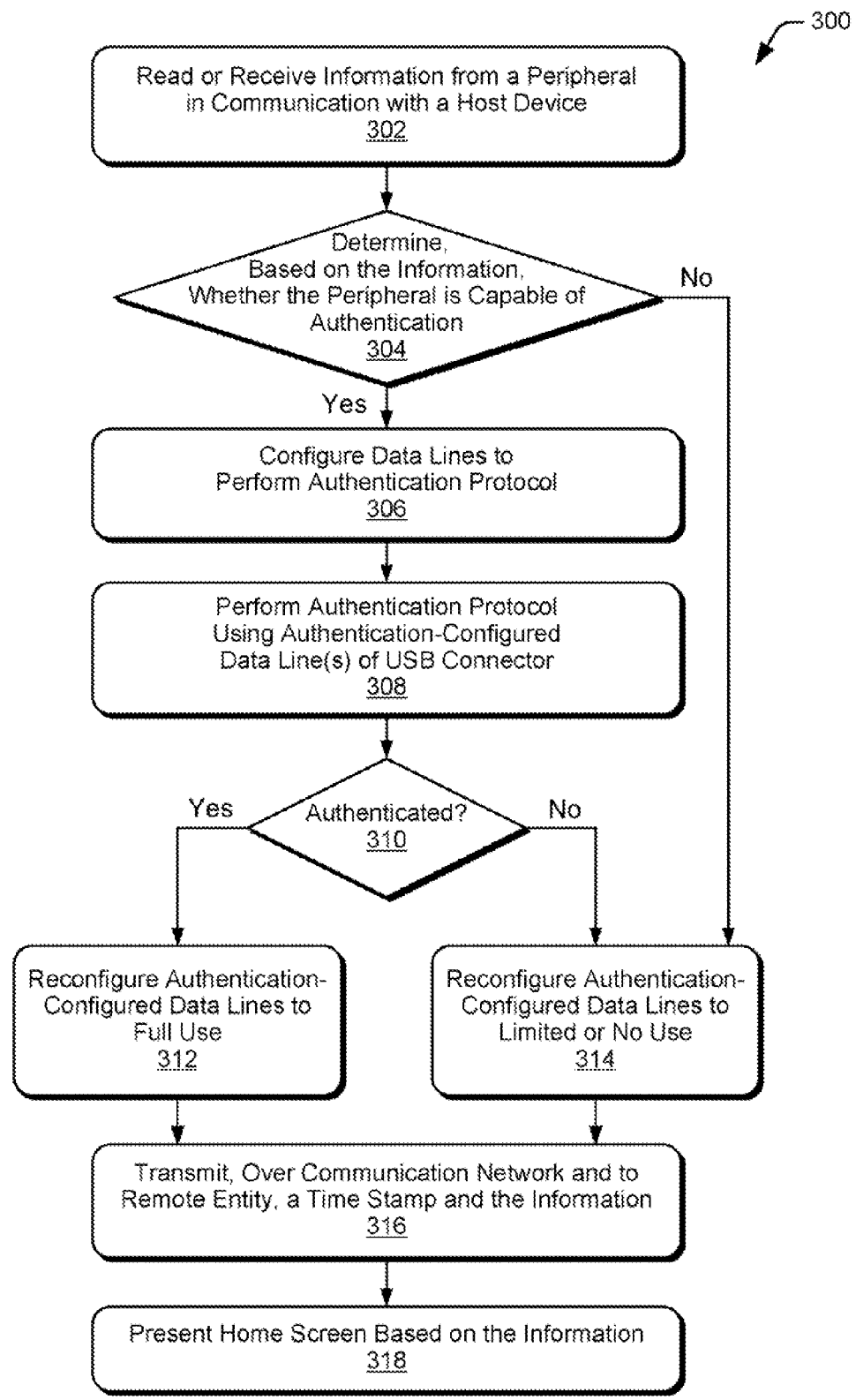
FIG. 3 illustrates example method(s) for authenticating, tracking, and using a peripheral performed at least in part by a host device.

FIG. 3 illustrates example method(s) 300 for authenticating, tracking, and using a peripheral performed at least in part by a host device.

At block 302, a host device reads or receives information from a peripheral. This information can indicate a type of the peripheral, such as a charger type or docking-station type, or an identifier for the peripheral (e.g., a unique identifier for a unique peripheral). This information can be responsive to a physical or wireless connection, such as micro USB cord 202 or a wireless communication.

Consider four example manners in which this information is read or received. In a first example, wireless headset 106-1 transmits a signal from wireless peripheral port 130 following a wireless personal-area-network (WPAN) protocol, which is received by host device 102 through wireless host port 114. In a second example, host device 102 receives information from charger 106-3 transmitted via wired peripheral port 128 through data lines 210 and/or 212 of micro USB cord 202, which host device 102 receives at wired host port 112. In this second example, information is received over data line(s) 210 and/or 212 according to a USB protocol, which permits transmission of data over D+ and D− lines 210 and 212 using half-duplex differential signaling. In half-duplex differential signaling, both data lines 210 and 212 transmit at the same time or receive at the same time.

In a third example, host device 102 reads a resistance on ID line 208 of micro USB cord 202 connected to peripheral port 128 using wired host port 112. In this third example, authenticator 116 of host device 102 actively engages with peripheral 106 by determining that ID line 208, and thus circuitry of peripheral 106, has a resistance consistent with a particular type of peripheral.

In a fourth example, host device 102 queries an element of peripheral 106 for a unique identifier associated with the element and/or peripheral 106. Host device 102 may query the element through communication medium 104 and in manners noted elsewhere herein (e.g., through data line(s) 210 and/or 212, other wires, or wirelessly, and using one or more protocols). The element may include authentication module 132 or an element providing services from peripheral 106 to host device 102 (e.g., service module 708 of FIGS. 7 and 8), to name just two examples. At some point following the query a unique identifier is received.

Block 302 can be performed multiple times and at various points in method(s) 300, including after receiving a type of peripheral at a first iteration of block 302 and then later receiving a unique identifier response to a later performance of block 302, such as responsive to a query for a unique identifier before, in conjunction with, or after any of blocks 304, 306, 308, 312, or 314.

At block 304, the host makes a determination, based on the information from the peripheral, as to whether the peripheral is capable of authentication. If capable of authentication, methods(s) 300 proceed along a "Yes" path to block 306. If not capable of authentication, method(s) 300 proceed along a "No" path to block 314.

Host device 102 may make this determination based on the type of peripheral or an identifier or just information indicating that peripheral 106 is potentially authentic, which may be a resistance found for ID line 208 (e.g., 200 k ohms) Host device 102 may determine the resistance on ID line 208 using authenticator 116 and/or a resistor divider, analog-to-digital converter, and/or a windowed comparator, to name a few.

Host device 102, through authenticator 116, can compare the identifier with a database of identifiers known to be authentic. A peripheral can be authenticated, or determined to be potentially authentic, when the peripheral is a device (or class of devices) previously known to be of a particular nature, generally a nature that has not been found to be potentially damaging or that has been designed to function with host device 102. In some embodiments, an authentic peripheral is one that includes an authentication module capable of successfully responding to a cryptographic challenge, such as authentication module 132.

At block 306, the host configures the data lines to perform an authentication protocol. Authenticator 116 can configure one or both data lines of host device 102 (which connect to data lines 210 and 212 of FIG. 2) and peripheral 106, for example, and use these data lines to perform the authentication protocol. Authenticator 116 can configure these data lines of peripheral 106, for example, by causing a hardware switch to activate in peripheral 106 through a voltage level placed on (or biasing) ID line 208.

In some cases, authenticator 116 configures data lines for asynchronous receiving and transmitting (e.g., following a universal asynchronous receiver/transmitter (UART) protocol), such as cases in which authentication module 132 is known or presumed to be configured for UART signaling. In more detail, UART protocols use non-differential signaling, such as one line for transmitting and another line for receiving data, and can implement either full-duplex or half-duplex data transfer depending on implementation. This differs from USB protocols, which use differential signaling, such as using both data lines to transmit or using both data lines to receive (at different times) and can only support half-duplex data transfer. This use of two lines for the UART protocol is optional, shown at dashed line 710 in FIG. 7. Depending on implementation, the UART protocol may use only a single line to perform half-duplex data transfer (e.g., use a one-wire authentication protocol).

Figure 7:
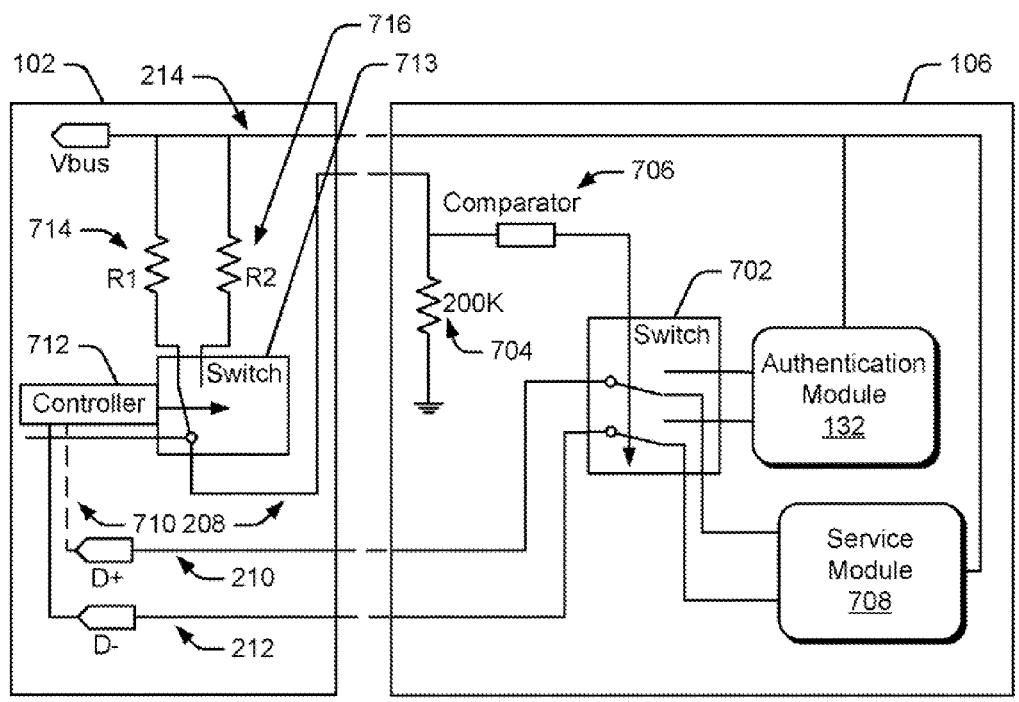
FIG. 7 illustrates examples of entities of FIG. 1 in communication through a universal serial bus cord.

As shown in FIG. 7, authenticator 116 can use a controller, here controller 712, capable of directing switch 713 from a first position (e.g., a position that enables a USB signaling configuration) with a first resistance R1 shown at 714 to a second resistance R2 shown at 716. This switch to resistance R2 creates a different voltage on ID line 208, which is sensed by comparator 706, which then causes switch 702 to configure data lines 210 and/or 212 to authentication module 132 (which uses UART signaling in this example) from service module 708 (which uses USB signaling in this example).

Ways in which authenticator 116 configures data lines are set forth in greater detail below.

For wireless communications, authenticator 116 communicates with peripheral 106 effective to configure data and control lines at host device 102 and peripheral 106 for wireless communications (e.g., with wireless headset 106-1) and following a network protocol (e.g., established by peripheral 106 with a radio-frequency communication (RFCOMM) serial port connection).

Note that these data lines are often previously configured, prior to block 306, for services rather than authentication, such as audio or video, reading and writing data, and power control, which can be performed in some embodiments by one peripheral (e.g., a music-playing device having memory and power). As noted previously, in some embodiments this previous configuration uses a different signaling scheme (e.g., USB signaling) than the authentication configuration (e.g., UART signaling).

At block 308, the authentication protocol is performed using the authentication-configured data lines to determine if the peripheral is authentic. Various manners of authentication can be used. In this ongoing example, the information received at block 302 includes an identifier, responsive to which authenticator 116 determines whether the identifier matches one of a set of authentic identifiers and, responsive to a match, challenges peripheral 106 through the authentication-configured data lines. This set of authentic identifiers is accessible by host device 102, such as by being stored in host media 110. If the information does not include an identifier, authenticator 116 can request an identifier from the peripheral either through the authentication-configured data lines or otherwise and proceed with a challenge-and-response form of authentication. Note that the identifier received at block 302 and the authentic identifiers of the set can be unique and/or cryptographically secure, though this is not required.

In one embodiment, authenticator 116 challenges peripheral 106 by sending a random number over the authentication-configured data lines. In response, peripheral 106 computes a response with a secret key and returns that response. Alternately, the peripheral 106 could use a look-up table to select a response to the challenge. Authenticator 116 receives that response, compares it with an expected response, and if they match, determines that peripheral 106 is authentic. To do so, authenticator 116 and/or peripheral 106 (e.g., using authentication module 132) may perform one or more cryptographic algorithms.

A "Yes" path proceeds from block 310 to block 312 responsive to the peripheral providing the expected response, or a "No" path proceeds from block 310 to block 314 responsive to the peripheral not being authenticated due to an unexpected response to the challenge.

At block 312, the host reconfigures the authentication-configured data lines to full use. This reconfiguration of authentication-configured data lines depends on various factors, such as whether or not host device 102 or peripheral 106 has control over functions and services of peripheral 106 and/or host device 102. At the least, however, authenticator 116 disconnects these data lines from the authentication module and establishes these data lines to a service module (e.g., controllers or service providers) of peripheral 106. Authenticator 116 may switch these data lines from authentication to service through ID line 208 or one of data lines 210 or 212, such as by delivering a voltage to one of lines 208, 210, or 212.

Continuing the example referenced above for FIG. 7, after confirming that peripheral 106 is authenticated, controller 712 switches from the second position where ID line 208 has resistance R2 shown at 716 back to the first position with ID line 208 having resistance R1 shown at 714. Thus, controller 712 switches from an authentication configuration of data lines 210 and 212 (here to authentication module 132 which uses UART signaling) to a service configuration (here to service module 708 which uses USB signaling). In some embodiments, however, authenticator 116 switches to a third configuration for data lines 210 and/or 212 rather than back to service module 708 (not shown).

Authenticator 116 may also configure ways in which host device 102 may act and interact with peripheral 106. Consider a case where host device 102 is a smartphone physically connected through micro USB cord 202 to battery charger 106-3. In such a case, authenticator 116 configures the data lines to accept whatever charging services are available from battery charger 106-3. The authenticator may also enable the controller to request a specific charging pattern from peripherals enabled in such a manner. Alternatively, the peripheral may be switched into one of the charging modes.

Authenticator 116 can also configure host device 102 to automatically launch software applications in response to determining that peripheral 106 is authentic, such as applications 120 of FIG. 1. Examples include: a user interface for an authenticated battery charger 106-3 showing a battery icon and time needed to complete the charging process; a mapping application for an authenticated car docking station; a telephony application for an authenticated mono (non-stereo) speaker or headset peripheral (e.g., wireless headset 106-1); a file management application for an authenticated smart flash drive 106-2; an audio media-playing application for an authenticated docking station 106-4 (having speakers); removal of a touch screen user interface for typing onto a touch screen of host device 102, such as when host device 102 is a tablet computer and for an authenticated keyboard 106-5 peripheral; and a printer user interface and printer driver applications for an authenticated multi-function printer 106-6. These are but a few of the many ways authenticator 116 can configure host device 102 in response to determining that peripheral 106 is authentic.

At block 314, the host reconfigures the authentication-configured data lines to limited or no use. Authenticator 116 may block the data lines from use, thereby halting communication with peripheral 106, such as when a peripheral is not authenticated. In some cases, however, authenticator 116 configures the data lines to limited use, though this depends on the type of peripheral 106 and whether control of the peripheral is maintained by the host device or the peripheral.

For example, authenticator 116 may establish these data lines to active components of peripheral 106 (here components capable of providing a charge) even when the peripheral is not authentic, but will limit services of peripheral 106 or of host device 102. In such a case, authenticator 116 may forgo automatically launching an application or refuse some services of peripheral 106. Assume, for example, that battery charger 106-3 is not authenticated. Assume also that host device 102 controls the charge coming from battery charger 106-3. Authenticator 116 disconnects the authentication-configured data lines from authentication procedures and establishes these data lines to active components of battery charger 106-3, where host device 102 then limits the services of battery charger 106-3 to a trickle charge and disallows fast charging. Host device 102 may also limit the total charge to a particular amount, such as a charge sufficient to make an emergency call.

Figure 4:
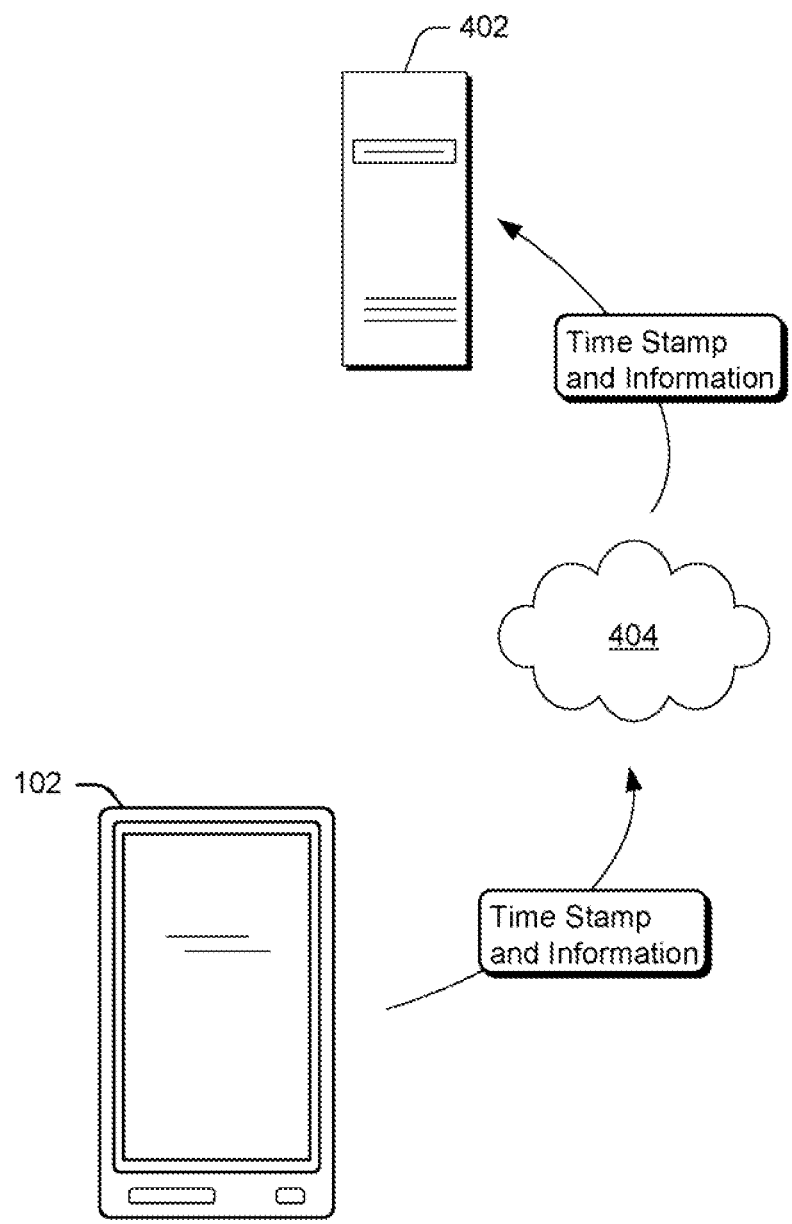
FIG. 4 illustrates the host device of FIG. 1 transmitting a time stamp and information to a remote entity over a communication network.

At block 316, the host transmits, over a communication network and to a remote entity, a time stamp and at least some information about the peripheral, such as the information read or received from the peripheral at block 302. Note that the information read or received from the peripheral could be "nothing" or "null". In other words, the peripheral does not have any type or identifier information that can be read by the host device, or the peripheral does not send a decipherable or valid type or identifier information to the host device. Additional information can include a location of the host device (as determined through cellular triangulation, a satellite positioning receiver, or other methods). These entities are illustrated in FIG. 4, which show host device 102 transmitting a time stamp and the information to remote entity 402 via communication network 404. Communication network 404 can include one or more of various networks described herein, such as a cellular network, a landline telephony network, a cable network, and a satellite network. Remote entity 402 includes data records associated with host device 102 and/or peripheral 106.

This time stamp corresponds to a time associated with connection or communication with peripheral 106, such as when information is read or received at block 302, when an authentication protocol is performed, or when services are provided or cease to be provided by peripheral 106. The information transmitted can be any information noted herein, such as a type or unique identifier of peripheral 106, or even no information at all. The information may also include other potentially useful data, such as the type of service provided (e.g., battery charging, media playing), the software version currently used by the peripheral 106 and/or the host device 102, how long the service was provided, particular aspects of the service (e.g., songs played by a media player), and data about performance of host device 102 (described in more detail elsewhere herein), and data about performance of peripheral 106.

In one example, assume that peripheral 106 is determined to be authentic responsive to which data lines are configured to full use at block 312. At block 316, host device 102 transmits a unique identifier of peripheral 106 to remote entity 402 via communication network 404, which here includes a cellular communication network.

In another example, assume that peripheral 106 is determined not to be authentic, responsive to which data lines are configured to limited use at block 314. Here prior to, or as part of, block 316, host device 102 uses the data lines to query an element of peripheral 106 for a unique identifier (e.g., host device 102 polls service module 708 for peripheral 106's identifier), receives that unique identifier, and, at block 316, transmits the unique identifier and a time stamp to remote entity 402.

Host device 102 may also record the time stamp and information (and optionally a location stamp) in non-volatile memory, such as host media 110 of FIG. 1. If a communication network or element thereof is not usable or an error occurs (e.g., on any one or more of a WLAN, WPAN, cellular network, LAN, or the Internet), recording the time stamp and information enables host device 102 to later perform block 316.

In some cases, transmission is performed responsive to a problem with host device 102, after which the record (and likely multiple other records of peripheral connections/communications/performance) is transmitted or read from host device 102.

Assume, for example, that host device 102 is damaged. To aid in investigating this damage, the time stamp and information is passed to an investigator. The time stamp and information can be passed directly from host device 102 or from remote entity 402. The investigator may determine that the damage was caused by a particular peripheral (which is likely but not necessarily non-authentic) based on the time stamp and information, which may affect warranty claims made for the damaged device. This time stamp and information can also be useful to ascertain service problems, remotely update software of the peripheral and/or the host device, and prevent future problems or damage for host devices and peripherals.

Returning to method(s) 300, at block 318, a home screen can be presented on host device 102 responsive to the information read or received from the peripheral and/or the peripheral being determined to be authentic or not authentic. Consider three scenarios described below.

In a first scenario, assume that peripheral 106 is found not to be authentic and determined to be capable of damaging host device 102. In such a case, authenticator 116 can configure data lines to prevent use. Manager 118 may present a home screen indicating that peripheral 106 cannot be used.

Figure 5:
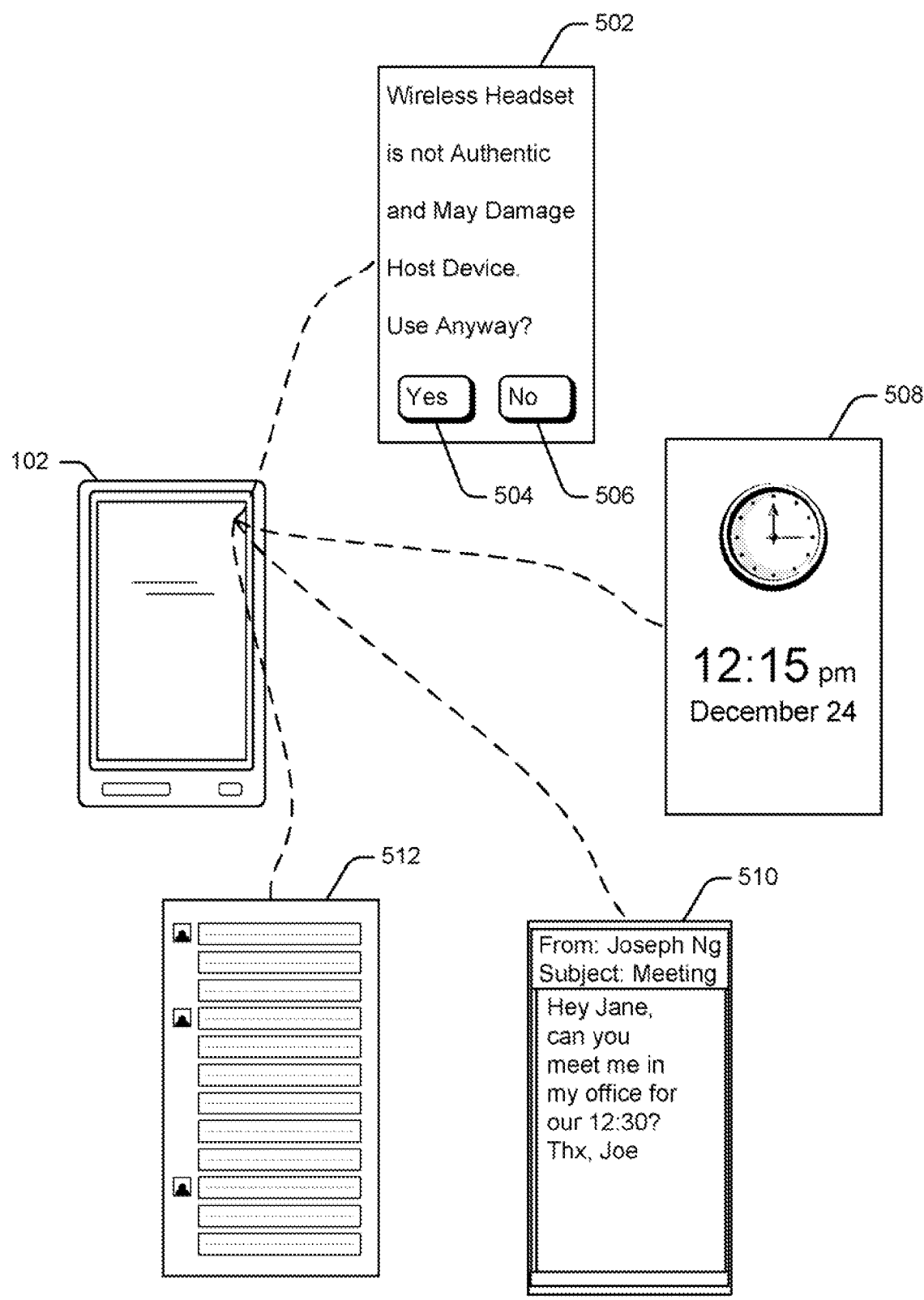
FIG. 5 illustrates example home screens.

In a second scenario, assume that peripheral 106 is found not to be authentic and determined to be unlikely to damage host device 102. In such a case, manager 118 may present a home screen permitting a user to select a limited use of the peripheral. For example, assume that peripheral 106 is wireless headset 106-1, which is determined not to be authentic but that limited use is permitted at block 314, and that information read or received at block 302 indicates only the type of peripheral but not a unique identity. Manager 118 presents example home screen 502 as shown in FIG. 5, which indicates that the peripheral is not authentic but that a user may select limited use of the peripheral through a Yes button control 504 or no use with a No button control 506. Responsive to a user selection to use wireless headset 106-1 through button control 504, manager 118 permits limited use. Note that this selection by the user is one example of data that may be recorded and/or transmitted at block 316. Selecting to use a non-authentic peripheral may preclude acceptance of a warranty claim, for example, if host device 102 is damaged by that use.

In a third scenario, assume that peripheral 106 is found to be authentic and that a unique identifier is known. In such a case, full use is permitted at block 312. At this point, manager 118 may determine which home screen to present based on various factors. In a simple case, manager 118 may present a default home screen based on the type of authentic peripheral. Thus, if peripheral 106 is battery charger 106-3, manager 118 can present a home screen showing a current battery power, charging rate, and expected time at which host device 102's battery will be fully charged. Other example default home screens include, for example, a clock (or alarm clock) for an authentic power docking station, a media user interface home screen for a media docking station (e.g., a station with an amplifier and speakers), a navigation user interface for an automobile docking station, a printer interface home screen for an authentic multi-function printer 106-6, or a home screen indicating that a peripheral is ready for use for an authentic wireless headset 106-1, smart flash drive 106-2, or keyboard 106-5. Manager 118 may present these home screens directly, or through other elements of host device 102, such as authenticator 116 or applications 120. Thus, in some cases, manager 118 configures host device 102 to automatically launch one of applications 120 in response to determining that peripheral 106 is authentic, some examples of which are described above.

Manager 118 may also or instead determine to use one of a set of possible default home screens 122 (a few examples are shown as 508, 510, 512) or a particular home screen based on a prior user selection. Assume that a user has three authentic docking stations 106-4, one in her home office, one in her kitchen, and one at her normal office. She is enabled to select, by manager 118 and/or application 120, which home screen 122 to have presented when the particular docking station is connected to host device 102. For her normal office she selects a clock default home screen 508, for her home office she selects an email user interface home screen 510 for viewing and interacting with an email application, and for her kitchen she selects a media player user interface 512 through which to select music to play and otherwise interact with a media application. These applications are examples of applications 120 and these home screens are examples of home screens 122, both of FIG. 1.

Thus, for each of these three home screens 508, 510, and 512, manager 118 determines which to present responsive to some record of the user's selection, such as a previously stored user selection associated with information about each peripheral. In addition to explicit user selection of a particular home screen for use with a particular peripheral, the host device may determine an implicit selection of a home screen based on the user's historical behavior. For example, the host device may select a home screen based on the fact that a particular application is used most frequently when a given peripheral is connected.

Note that presentation of a home screen at block 318 may be automatic and without requiring any user interaction. A home screen can be presented by manager 118 (or by an application prompted by manager 118) without a user needing to interact with host device 102 or peripheral 106. Simply having host device 102 in communication with peripheral 106 can be sufficient.

Figure 6:
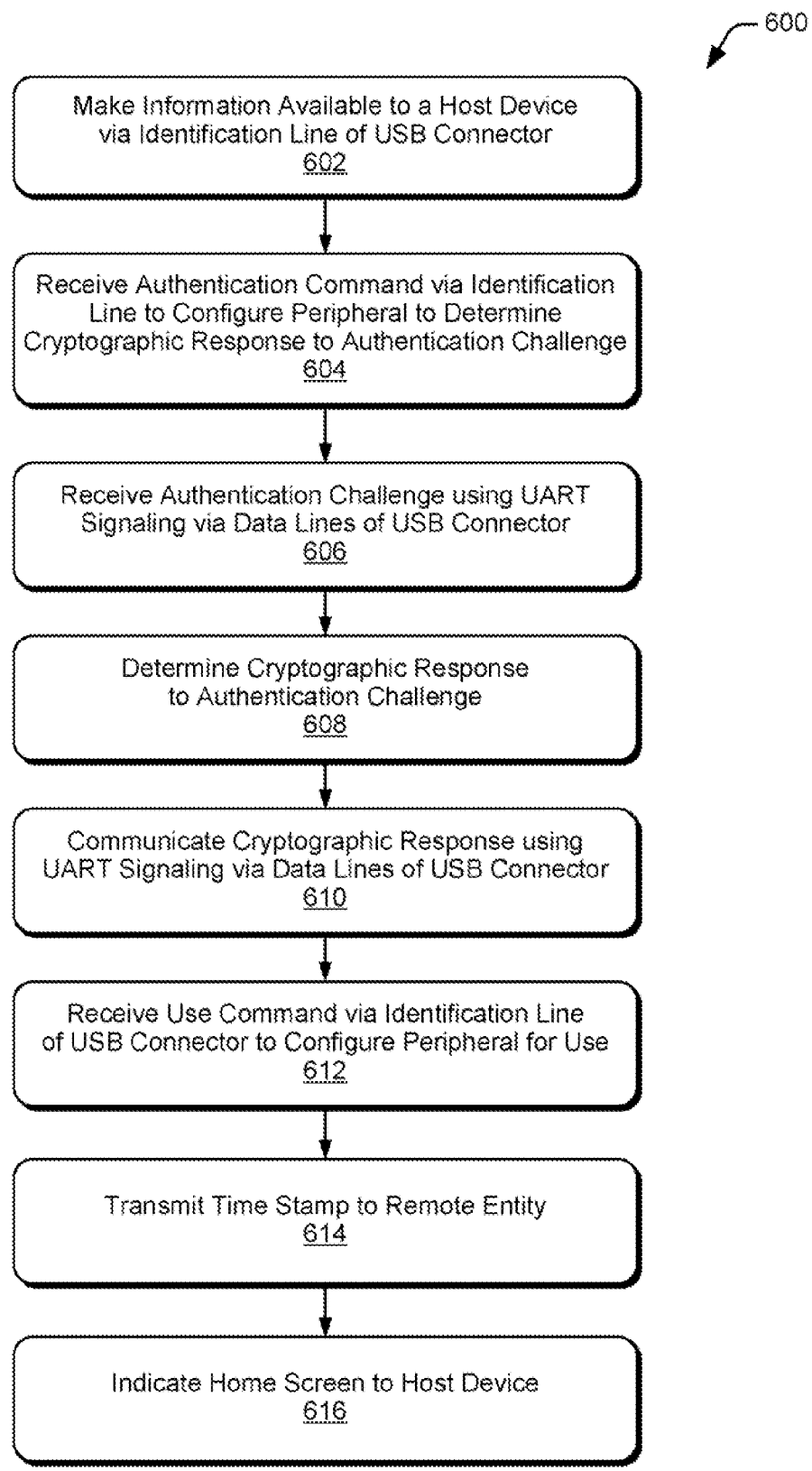
FIG. 6 illustrates example method(s) for authenticating, tracking, and using a peripheral performed at least in part by a peripheral to a host device.

FIG. 6 illustrates example method(s) 600 for authenticating, tracking, and using a peripheral performed at least in part by a peripheral to a host device. The order in which the method blocks are described are not intended to be construed as a limitation, and any number or combination of the described method blocks can be combined in any order to implement a method, or an alternate method.

At block 602, information is made available to a host device (e.g., via an identification line of a universal serial bus connector), the information indicating that a peripheral to the host device is capable of authentication. As noted from the host device's perspective in FIG. 3, this information can include an identifier or type of peripheral 106, as well as a simple indication of potential authenticity, such as peripheral 106 indicating (including passively) that it includes authentication module 132. When the information is a type of peripheral or a simple indication of potential authenticity, authentication module 132 may make this information available by setting or increasing resistance on identification line 208 of FIG. 2. This identifier or type of peripheral 106, however, may also be provided later in the process through data lines 210 or 212, such as through authentication-configured data line(s) following block 604.

At block 604, the peripheral receives an authentication command from the host device via the identification line, the authentication command effective to configure the peripheral to determine a cryptographic response to an authentication challenge. This authentication command can provide instructions or cause changes to peripheral 106, such as through a voltage level placed on ID line 208. Two examples are described immediately below in FIGS. 7 and 8.

FIG. 7 illustrates examples of host device 102 and peripheral 106 in communication through a universal serial bus connector having five lines (GND line not shown). Peripheral 106 has a configuration switch 702, identification-line resistance 704, voltage comparator 706, at least one service module 708 through which peripheral services are provided, accessed, or controlled, and authentication module 132. Configuration switch 702 is configured to switch between an authentication mode of peripheral 106 and a use mode of peripheral 106, in this example by switching data lines 210 and 212 responsive to a voltage on identification line 208.

For the ongoing example, host device 102 creates a voltage on identification line 208 effective to overcome identification-line resistance 704, which causes voltage comparator 706 to switch (using switch 702) data lines 210 and 212 connections from service module 708 to authentication module 132. FIG. 7 also shows VBUS line 214, from which authentication module 132 can receive power sufficient to respond to an authentication challenge. VBUS line 214 provides power in cases where peripheral 106 does not have a power source or is currently without sufficient power to operate authentication module 132. By so doing, the authentication command completes the circuit thereby permitting authentication module 132 to respond to an authentication challenge.

Figure 8:
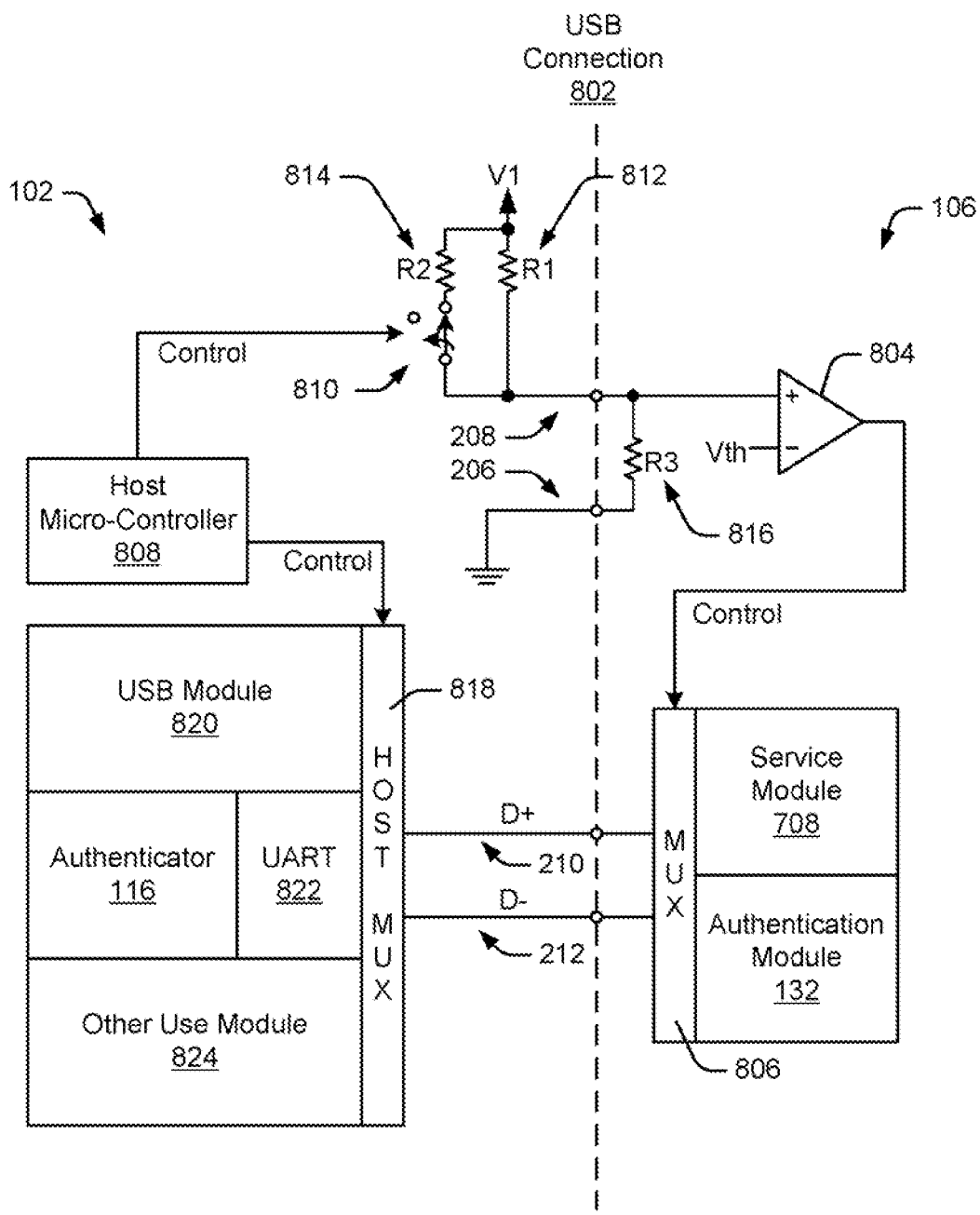
FIG. 8 illustrates examples of entities of FIG. 1 in communication through a universal serial bus cord.

FIG. 8 illustrates examples of host device 102 and peripheral 106, here shown communicating through USB connection 802. Peripheral 106 has an op-amp comparator 804 capable of controlling (based on a voltage set by host 102) a multiplexer 806 effective to configure data lines 210, 212 to either service module 708 or authentication module 132. As shown, in these examples host micro-controller 808 controls the actions of op-amp comparator 804 through ID line 208 through various resistances and using a host switch 810. This host switch 810 controls op-amp comparator 804 by adjusting pull-up resistance in host 102, first resistance R1 shown at 812 and second resistance R2 shown at 814, on ID line 208, which is affected by resistor R3 shown at 816 in peripheral 106 (through which ID line 208 is connected to ground through ground line 206).

Note in this case that host device 102 uses host micro-controller 808 to also control use of data lines 210, 212 through host multiplexer 818 effective to use elements of host 102, namely USB module 820, authenticator 116, universal asynchronous receiver/transmitter (UART) module 822, and/or other use module 824. In these examples of host 102 and peripheral 106, host micro-controller 808 performs some of the actions attributed to authenticator 116 noted above. After host micro-controller 808 connects UART module 822 to data lines 210, 212 through host multiplexer 818, however, authenticator 116 performs, through serial communications over UART module 822, an authentication protocol. If authenticator 116 determines that the peripheral is authentic, host micro-controller 808 switches data lines 210, 212 from authentication to services. In such a case, host micro-controller 808 connects USB module 820 or other use module 824, through host multiplexer 818 to service module 708 through multiplexer 806. By so doing, host 102 may use services of peripheral 106.

Returning to FIG. 6, at block 606, the peripheral receives the authentication challenge from the host device (e.g., via data lines of the USB cord). As noted above, the authentication challenge can be received from authenticator 116 of host device 102 over authentication-configured data lines 210 and 212.

In some cases, the peripheral makes an identifier available to the host through the authentication-configured data lines after block 604 but prior to block 606. In such a case, the authentication challenge and response may be based on this identifier. For this example, assume that the authentication challenge is a large random number that may or may not be based on a provided identifier.

At block 608, a cryptographic response to the authentication challenge is determined. While other manners of authentication can be used, in this example authentication module 132 of peripheral 106 computes, based on the large random number received at block 606, a response using a secret key.

At block 610, the cryptographic response is communicated to the host device (e.g., using UART signaling via the data lines of the USB connector). As noted above, authenticator 116 of host device 102 can receive the cryptographic response, compare it with an expected response, and if they match, authenticate peripheral 106.

In an alternative embodiment, the authentication challenge and response include a request for an identifier securely stored in peripheral 106 (e.g., in authentication module 132) and a response having this identifier, respectively. The determination at block 608, in this example, may simply find this identifier in a look-up table or other data structure and, at block 610, communicate this identifier via the authentication-configured data lines. Authenticator 116 of host device 102 may receive this identifier, compare it to one or more authentic identifiers expected for peripheral 106, and if a match is found, authenticate peripheral 106.

At block 612, a use command is received from the host device (e.g., via the identification line of the USB cord), the use command effective to configure the peripheral for use. This use command, when received from host device 102 by peripheral 106, affects services provided by and functions of peripheral 106. As noted above, however, host device 102 may also or instead provide or limit various applications and services of host device 102 based on the authenticity of peripheral 106.

Consider a case where peripheral 106 is smart flash-drive 106-2, which is authenticated by host device 102. In such a case, the use command causes the authentication-configured data lines to be disconnected from authentication module 132 and coupled to service module 708 to send and receive data to and from flash memory. In an alternate case, where smart flash-drive 106-2 is not authenticated, peripheral 106 may not receive this use command but instead have data lines blocked for USB data input to host device 102 but allowed for USB data output from host device 102 effective to permit write-only capabilities to the smart flash-drive 106-2. If the data lines are switched over to use for services when peripheral 106 is not authenticated, host device 102 may limit functions of peripheral 106 (though not directly by blocking the data lines). In other cases, the host device 102 may completely block data communication both to and from the peripheral 106. As noted above, authenticator 116 may limit functions and services of host device 102 whether or not authenticator 116 limits peripheral 106.

Although two modes are described in many examples above, other modes are also contemplated. For example, comparator 706 of FIG. 7 may have two outputs, thereby enabling three modes, such as an analog audio mode in addition to the USB data and authentication modes mentioned above.

At block 614, a time stamp is communicated to a remote entity and over a communication network. This time stamp can correspond to various times during or after method(s) 600, such as when services are provided to host device 102, when an error or damage has occurred to host device 102 or peripheral 106, or responsive to receiving the use command at block 612. The remote entity and communication network can include those described above, such as remote entity 402 and communication network 404. Note that block 614 is somewhat duplicative of block 316 (FIG. 3). Depending on various implementations, both blocks 316 and 614 may be performed, or only one of block 316 and block 614.

At block 616, a home screen is indicated to the host device. This home screen can be one of the many described above. Peripheral 106 may determine which home screen 122 should be presented based on a default or a prior user selection stored on peripheral 106. In one embodiment, peripheral 106 indicates the home screen to manager 118, responsive to which manager 118 presents the indicated home screen in manners set forth above (e.g., at block 318 of FIG. 3).

Example Peripheral

Figure 9:
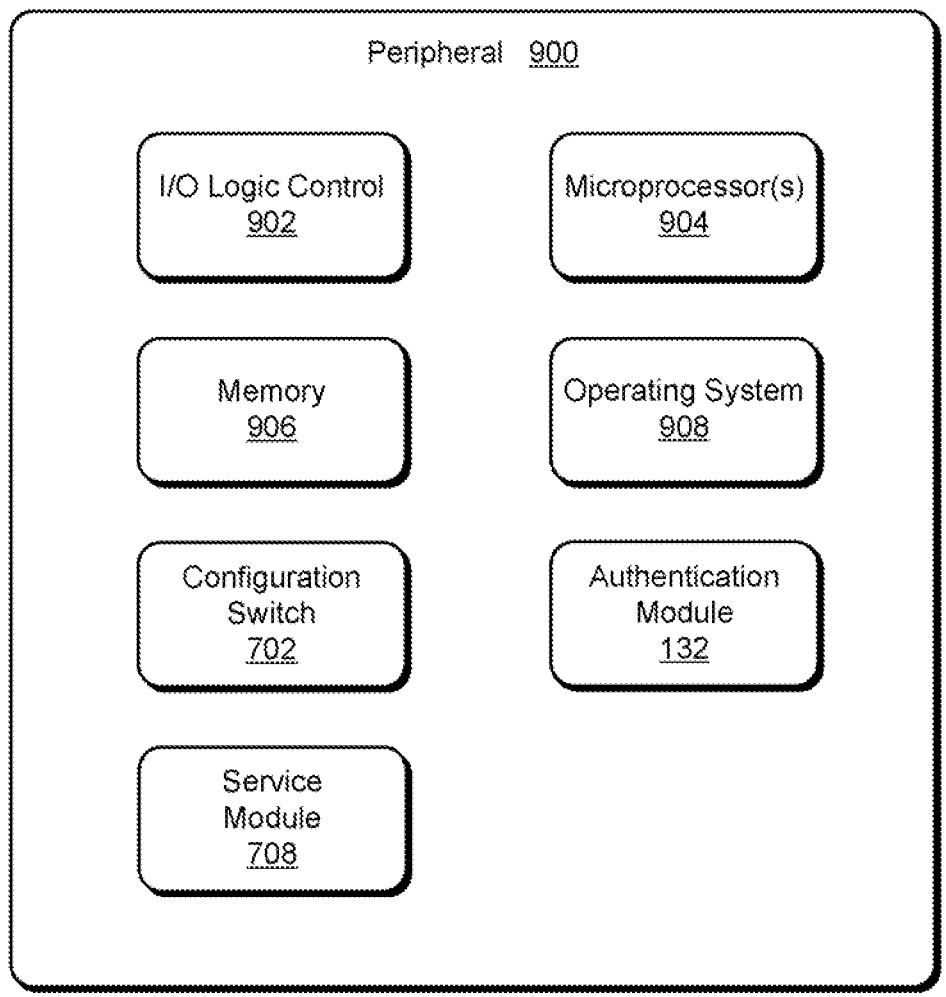
FIG. 9 illustrates various components of an example peripheral that can implement techniques for authenticating, tracking, and using a peripheral.

FIG. 9 illustrates various components of an example peripheral 900, which is implemented in hardware, firmware, and/or software, or as described with reference to any of the previous FIGS. 1-8 to implement authenticating, tracking, and using a peripheral.

Example peripheral 900 can be implemented in a fixed or mobile device being one or a combination of a media device, computer device, television set-top box, video processing and/or rendering device, appliance device (e.g., a closed-and-sealed computing resource, such as some digital video recorders or global-positioning-satellite devices), gaming device, electronic device, vehicle, workstation, WLAN peer device/client station, and/or in any other type of device that may communicate through a wired or wireless communication medium to a host device. Examples of some of these are shown in FIG. 1 at 106.

Example peripheral 900 can be integrated with electronic circuitry, a microprocessor, memory, input-output (I/O) logic control, communication interfaces and components, other hardware, firmware, and/or software needed to run an entire device. Example peripheral 900 can also include an integrated data bus (not shown) that couples the various components of the peripheral for data communication between the components.

Example peripheral 900 includes various components such as an input-output (I/O) logic control 902 (e.g., to include electronic circuitry) and a microprocessor 904 (e.g., any of a microcontroller or digital signal processor). Example peripheral 900 also includes a memory 906, which can be any type of random access memory (RAM), a low-latency nonvolatile memory (e.g., flash memory), read only memory (ROM), and/or other suitable electronic data storage. Example peripheral 900 can also include various firmware and/or software, such as an operating system 908, which can be computer-executable instructions maintained by memory 906 and executed by microprocessor 904. Example peripheral 900 can also include other various communication interfaces and components, wireless LAN (WLAN) or wireless PAN (WPAN) components, other hardware, firmware, and/or software.

Example peripheral 900 includes configuration switch 702, service module 708, and authentication module 132. Examples of these components and their functions are described with reference to the respective components as shown in FIGS. 1, 7, and/or 8.

Authentication module 132 in example peripheral 900, either independently or in combination with other entities, can be implemented as computer-executable instructions maintained by memory 906 and executed by microprocessor 904 to implement various embodiments and/or features described herein. Authentication module 132 may also be provided integral with other entities of the peripheral, such as integrated with configuration switch 702. Alternatively or additionally, authentication module 132 and the other components can be implemented as hardware, firmware, fixed logic circuitry, or any combination thereof that is implemented in connection with the I/O logic control 902 and/or other signal processing and control circuits of example peripheral 900.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A method, comprising:
    determining, based on information read or received from a peripheral in communication with a host device, that the peripheral is capable of authentication;
    configuring data lines for non-differential signaling;

performing an authentication protocol using the non-differential signaling data lines effective to authenticate the peripheral;
responsive to the peripheral being authenticated, re-configuring the non-differential signaling data lines back to differential signaling for full use, or
responsive to the peripheral not being authenticated, configuring the non-differential signaling data lines for limited use or no use; and
transmitting, over a communication network and to a remote entity, a time stamp and the information read or received from the peripheral.

2. The method as recited in claim 1, further comprising:
presenting, based on the information read or received from the peripheral, or responsive to the peripheral being authenticated or not being authenticated, a home screen on the host device.

3. The method as recited in claim 2, wherein presenting the home screen is responsive to the peripheral being authenticated and the information indicates that the peripheral is:
a power docking station and wherein the home screen is a clock;
a media docking station and wherein the home screen is a media user interface;
an automobile docking station and wherein the home screen is a navigation user interface;
a wireless headset and wherein the home screen indicates that the wireless headset is ready for use;
a smart flash drive and wherein the home screen indicates that the smart flash drive is ready for use;
a keyboard and wherein the home screen indicates that the keyboard is ready for use; or
a multi-function printer and the home screen is a multi-function printing user interface.

4. The method as recited in claim 2, wherein presenting the home screen is responsive to the peripheral not being authenticated and the home screen indicates that use of the peripheral may damage the host device or affect a warranty associated with the host device.

5. The method as recited in claim 2, further comprising determining the home screen based on the information and a previously stored user selection associated with the information.

6. The method as recited in claim 1, wherein the information read or received from the peripheral uniquely identifies the peripheral.

7. The method as recited in claim 1, further comprising:
querying the peripheral for a unique identifier; and
receiving the unique identifier responsive to the querying.

8. The method as recited in claim 1, wherein the information read or received from the peripheral identifies a type of the peripheral but does not uniquely identify the peripheral.

9. The method as recited in claim 1, further comprising:
storing the time stamp and the information on nonvolatile memory of the host device.

10. The method as recited in claim 1, wherein the time stamp corresponds to a time at or about when the information is read or received, when the authentication protocol is performed, or when the transmitting the time stamp is performed.

11. The method as recited in claim 1, wherein the information is read from the peripheral via an identification line of a universal serial bus connector having five or more lines.

12. The method as recited in claim 1, wherein the information is read from the peripheral and identifies a type of the peripheral and the type indicates that the peripheral is capable of authentication.

13. The method as recited in claim 1, wherein performing the authentication protocol includes:
requesting an identifier from the peripheral;
receiving the identifier from the peripheral;
determining whether the identifier matches one of a set of authentic identifiers; and
challenging the peripheral through the non-differential signaling data lines responsive to the identifier matching one of the set of authentic identifiers.

14. A method, comprising:
making information available to a host device, the information indicating that a peripheral to the host device is capable of authentication;
receiving an authentication command from the host device, the authentication command effective to configure the peripheral to: uncouple data lines from a service module and complete a circuit that includes the data lines and an authentication module of the peripheral, the authentication module to determine a cryptographic response to an authentication challenge;
receiving the authentication challenge from the host device;
communicating the cryptographic response to the host device;
receiving a use command from the host device, the use command effective to configure the peripheral for use by uncoupling the data lines from the authentication module and coupling the data lines to the service module; and
transmitting, over a communication network and to a remote entity, a time stamp.

15. The method as recited in claim 14, further comprising indicating, to the host device, a home screen to present on the host device.

16. The method as recited in claim 15, further comprising, prior to indicating the home screen:
determining the home screen to present on the host device based on a previously stored user selection.

17. The method as recited in claim 16, wherein the peripheral is a docking station and the previously stored user selection indicates that the home screen to present on the host device is a clock, a media user interface, a navigation user interface, or an email user interface.

18. The method as recited in claim 14, wherein the authentication command closes a switch in the peripheral and the data lines are of a USB connector.

19. A peripheral to a host device, the peripheral comprising:
a service module coupled to data lines;
an authentication module configured to make information available to the host device, the information indicating that the peripheral is capable of authentication; and
a switch configured, on receipt of an authentication command from the host device, to:
uncouple the data lines from the service module; and
complete a circuit that includes the data lines and the authentication module of the peripheral,
the authentication module further configured, when part of the circuit, to:
determine a cryptographic response to an authentication challenge from the host device; and
communicate the cryptographic response to the host device,
the switch further configured, on receipt of a use command from the host device, to:
uncouple the data lines from the authentication module; and
couple the data lines to the service module, and the authentication module further configured to cause a time stamp to be communicated over a communication network and to a remote entity.

20. The peripheral to the host device of claim 19, wherein the authentication module or the service module is further configured to indicate, to the host device, that the peripheral is one of:
- a power docking station and a home screen including a clock;
- a media docking station and a home screen including a media user interface;
- an automobile docking station and a home screen including a navigation user interface;
- a wireless headset and a home screen indicating that the wireless headset is ready for use;
- a smart flash drive and a home screen indicating that the smart flash drive is ready for use;
- a keyboard and a home screen indicating that the keyboard is ready for use; or
- a multi-function printer and a home screen that is a multi-function printing user interface.

* * * * *